United States Patent [19]

Holzem et al.

[11] 4,193,299
[45] Mar. 18, 1980

[54] APPARATUS FOR METERING FLUID FLOW

[75] Inventors: Heinz Holzem, Monchengladbach; Hans J. Henning, Neuss, both of Fed. Rep. of Germany

[73] Assignee: Pierburg Luftfahrtgerate Union GmbH, Neuss am Rhein, Fed. Rep. of Germany

[21] Appl. No.: 915,230

[22] Filed: Jun. 13, 1978

[30] Foreign Application Priority Data

Jun. 23, 1977 [DE] Fed. Rep. of Germany ....... 2728250

[51] Int. Cl.$^2$ ............................................. G01F 15/02
[52] U.S. Cl. ..................................................... 73/199
[58] Field of Search ................. 73/199, 261, 113, 114, 73/197, 194 R, 19 S

[56] References Cited

U.S. PATENT DOCUMENTS

| | | | |
|---|---|---|---|
| 1,797,233 | 3/1931 | Huebotter | 73/261 |
| 3,633,420 | 1/1972 | Holzem | 73/197 X |

*Primary Examiner*—Jerry W. Myracle
*Attorney, Agent, or Firm*—Toren, McGeady and Stanger

[57] ABSTRACT

Fluid flow metering and control apparatus includes a positive displacement flow meter, a pressure sensor responsive to the pressure difference between the inlet and the outlet of the flow meter and a servo drive mechanism controlled by the pressure difference sensor to maintain the pressure difference between the inlet and outlet side of the flow meter at zero. A hydraulic motor is utilized as the servo drive means.

13 Claims, 7 Drawing Figures

APPARATUS FOR METERING FLUID FLOW

BACKGROUND OF THE INVENTION

The present invention relates generally to apparatus for metering and controlling fluid flow and more particularly to a device to provide an immediate and continuous measurement and control of a flowing fluid whereby a desired flow rate of the fluid may be established. The invention is especially applicable in devices for controlling the flow of fuel in internal combustion engines and the invention will be particularly appropriate for use on motor vehicles.

Apparatus of the type to which the present invention relates is disclosed in U.S. Pat. No. 3,633,420. The apparatus disclosed in this patent has been used particularly in connection with testing apparatus, for example in motor vehicle workshops where simple and quick determination of fuel consumption is desired. Such apparatus may be mounted in a vehicle during a test run or it may be used in a laboratory where tests are performed.

It will be apparent that apparatus of this type is particularly useful in view of the present day concern with energy conservation. Clearly, the consumer has undergone a significant increase in the awareness of the significance of energy sources and this awareness has led to a desire to provide for economically enhanced utilization of available fuel supplies. Of particular significance is the consumption of fuel in motor vehicles and great efforts have been directed toward this goal. Particularly, owners of motor vehicles are now giving consideration to matters of fuel consumption when purchasing a vehicle and during its operation. Furthermore, manufacturers of automobiles make available data regarding fuel consumption of the vehicles in response to public demand for such data. Despite the fact that data of this type are published, the statistics involved tend to be only approximate and lacking in optimum accuracy. Furthermore, most vehicles are not equipped to provide a continuous indication of the fuel consumption economy of the vehicle during its operation nor are there provided instruments to enable continuous indication of the fuel consumption characteristics of the vehicle in order to enable optimum adjustment of driving behaviour.

Thus, it will be found that while the prior art devices will make possible satisfactory measurements or indications for test purposes, such arrangements tend to be extremely cumbersome if installed as standard equipment on motor vehicles and because of this they have been found to be unacceptable for this purpose.

The present invention is based upon the goal of providing an apparatus of the type discussed which is simpler in structure and operation to such a degree that it may be found suitable for permanent installation particularly as standard equipment in motor vehicles with the equipment being provided at reasonable costs.

In evaluating the specific objects sought to be achieved by the equipment and design of this type of apparatus, it will be found that three essential components must be provided. First, apparatus of this type will generally include a positive displacement type of measuring device through which the flow is passed and by which the flow rate is measured. Secondly, a pressure sensing means is provided to sense the pressure developed between the inlet and outlet of the flow meter. Thirdly, the equipment will include a servo drive mechanism which, in known devices, is usually an electronically controlled electro motor.

SUMMARY OF THE INVENTION

The present invention proposes that the servo drive mechanism which is to be utilized in apparatus for metering and controlling fluid flow be a hydraulic motor. Thus, in accordance with the present invention, a positive displacement flow meter is provided and a pressure sensor means is connected between the inlet and outlet of the flow meter. The pressure sensor is essentially connected within a by-pass flow line across the flow meter and a servo motor is connected to be responsive to the pressure sensed by the pressure sensor in order to control operation of the positive displacement flow meter to maintain the pressure difference thereacross equivalent to zero.

By utilization of commercially available inexpensive hydraulic motors for the servo drive of the invention, there are provided opportunities for surprising possibilities to enable further modification of such devices leading to significant advantages not only with regard to the economic considerations but also concerning technical characteristics, particularly when control is also effected hydraulically.

In the prior art patent mentioned heretofore, an integral pressure difference measurement is performed by a freely moveable piston which is arranged in a by-pass line of the positive displacement meter. The piston is constructed to have a specific weight corresponding to the density of the fluid. However, such a device involves a rather elaborate construction for the pressure difference measuring element and although such a device would be acceptable for use in testing apparatus of the type discussed its use would generally require a different construction particularly for the measuring component where, for example, different types of fuel are to be handled.

Additionally, pistons of this type are easily deformed when exposed to a demanding continuous operation and varying outside pressures, and such exposure may result in invalidation of the results of test measurements. Therefore, it is especially advantageous to provide a modification in accordance with the present invention whereby in the by-pass line a freely moveable piston is arranged, the piston consisting perferably of a light metal such as aluminum and being configured with a cup-shaped configuration having one open side. The piston moves within a range of measurement as a function of pressure difference. Movements of the piston will cause corresponding changes in a measured value or in a control value, as will be further clarified hereinafter, and this represents a special embodiment of the invention wherein the piston practically forms the regulating unit. The light-metal construction of the piston allows the piston to be formed with very thin walls so that, at a very small mass of the piston, only insignificant friction forces will arise during its movements. Considering the significant simplification in manufacturing as well as the substantially reduced costs, the losses in accuracy which may be encountered are considered insignificant and in continuous use as standard equipment, in accordance with the invention, such losses will be found negligible.

As previously mentioned, the utilization of a hydraulic motor as the servo drive for the apparatus offers a surprising variety of simplifying possibilities with regard to the design of the apparatus. For example, in accordance with a further feature of the invention it would be possible to simultaneously utilize the measuring fluid also as the hydraulic fluid. This measure will result in significant advantages including the ability to provide the apparatus with a relatively simple construction requiring less space. Such a construction will avoid many sealing problems since leakage at the shaft between the servo motor and the displacement meter will not operate to cause any significant damage.

Particularly in vehicles utilizing carburetors or fuel injectors, as well as other fuel dosing systems, there will result the further possibility of simplification residing in the fact that operating pressures for the hydraulic motor can be generated by the pressure source which also produces the delivery pressure for the fluid being measured which is flowing through the displacement meter. With respect to the desired simplification of such a design, there is enabled an especially advantageous variation since only a single fuel pump upstream of the displacement meter is required with this pump not only providing the energy required to pump the fluid to its ultimate destination for use but the pump may also provide the energy source required by the hydraulic motor.

In a further simplification of the system of the invention and as a modification thereof, the pressure difference sensor may be formed together with a regulating unit of the hydraulic motor as a single component. For example, this may be accomplished by a construction involving a piston moveably received within a cylinder. The end faces of the cylinder are connected at locations upstream and downstream of the displacement meter and the cylinder may be provided with at least one outlet slot near that end face thereof which is assigned to the location forwardly of the displacement meter with a line leading from this outlet slot to the inlet side of the hydraulic motor. Such an arrangement not only provides an especially compact design of the measuring point and of the regulating unit but it also reduces the susceptibility to problems due to the small number of components involved since the piston of the pressure difference sensor will simultaneously perform the dosing function for the fluid required by the hydraulic motor, i.e. the piston will act as a regulating unit.

In certain cases involving application of the invention it may be desirable to avoid as much as possible back flow of large amounts of the measuring medium. Additionally, in such a case the basic concept of the invention will offer a surprisingly simple solution by connecting in series the hydraulic motor and the displacement meter, with the discharge of the displacement meter being delivered to the point of use of the flowing fluid with the pressure difference sensor acting on a valve arranged in a bypass line which is assigned to the hydraulic motor. Thus, fluid flow pumped by the motor to the use location flows first through the hydraulic motor and subsequently through the displacement meter where the flow is measured and from there to the point of ultimate use.

In those cases where the best possible accuracy is not absolutely necessary the number of components may be further reduced and cost may be lowered if instead of a pressure difference sensor, a tuned combination of throttles were to be provided and if the measuring fluid is divided into two partial flows in front of the displacement meter. In this connection it should be noted that for the applications herein considered absolute measuring accuracy is not deemed to be the decisive factor but rather the requirement that reproducibility be as exact as possible.

Of the partial flows involved, the first partial flow will reach the displacement meter through a first throttle while a second partial flow is fed to the hydraulic motor through a second throttle. The discharge of the motor is fed back in front of the displacement meter to the measuring fluid reaching the point of use. Such a design is possible because the power output of the hydraulic motor is proportional to the liquid flow passing through the motor and proportional to the pressure drop so that the measuring medium flowing through the hydraulic motor may be controlled parallel to a stationary nozzle in such a manner that the medium is proportional to the drop in pressure at this stationary nozzle. Since, furthermore, the power input of a displacement meter changes relative to the flow in approximately the same manner as the changes occurring in the pressure difference of a stationary nozzle with the flow, it is possible to control the hydraulic motor of the invention in this manner so that it has a power output which approximately corresponds to the power which is required by the displacement meter in order to maintain the pressure difference thereacross at zero.

Finally, the group of components containing the servo drive means may be significantly simplified by, in accordance with another feature of the invention, by structuring the displacement meter and the hydraulic motor as a single integrated component. As a result, a separate transmission mechanism will not be required which is of particular advantage with regard to the compact structure desired. There are two possibilities whereby such an integrated component arrangement may be realized. First, for the displacement meter an internal gear pump may be provided whose outer gear is in the form of a hydraulic motor and is simultaneously provided with turbine blades at the outer periphery, with impingement of the blades preferably being effected from the regulating unit through a nozzle. Also, as a displacement meter an external gear pump may be utilized, with the teeth of one or both of the gears serving as turbine blades in addition to effecting displacement of the fluid. However, on the other hand, it is also possible to provide an external gear pump as the displacement meter, with one gear of the pump simultaneously functioning as part of an external gear pump forming the hydraulic motor.

The embodiments last mentioned will be found particularly to facilitate optimum mounting, for example, directly at the housing of a carburetor or a fuel injector as well as in the carburetor cap. As a result, in addition to the advantage of a rather small sized structure, there will also exist the possibility of achieving a cooling effect either at the carburetor, the fuel injector or the control system, by means of the fuel flowing back to the tank. These advantages may also be achieved, at least in part, by mounting only a portion of the components of the apparatus of the invention at or in the housing of the fuel dosing apparatus.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
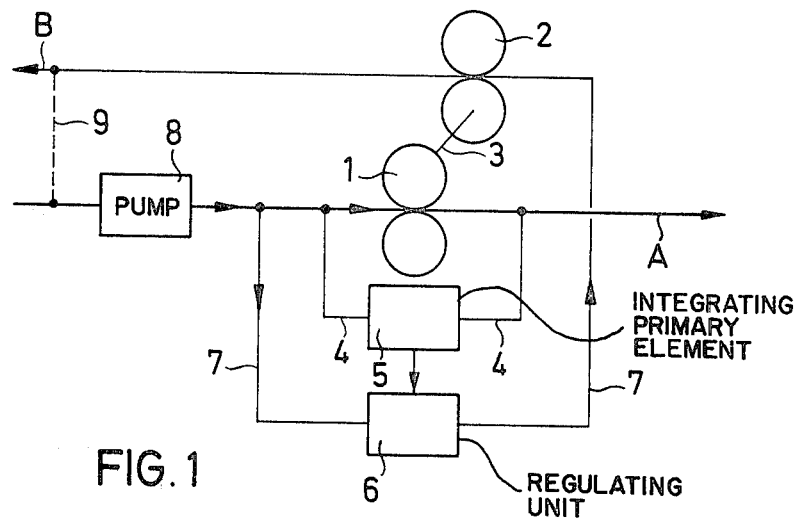
FIG. 1 is a schematic representation of a first embodiment of the invention.

Referring now to the drawings and more particularly to FIG. 1 there is shown an embodiment of the invention according to which use is made of the advantage offered by the inventive concept of employing a hydraulic motor for the measuring and dosing apparatus, namely the invention thereby enabling utilization as the hydraulic fluid the same fluid as that which is being pumped through the system as the main fluid which is also the fluid that flows through the displacement meter. As will be seen from the schematic diagram of FIG. 1, a displacement meter 1 is driven by a hydraulic motor 2 through a mechanical transmission device 3. As discussed in detail in the aforementioned U.S. Pat. No. 3,633,420, the specific feature of measuring apparatus of this type resides in the fact that the pressure difference between the inlet and the outlet of the displacement meter is held at zero. In FIG. 1, the main flow through the system and the flow through the displacement meter 1 is indicated as flowing in the direction of the arrow A.

Maintenance of the pressure difference across the displacement meter to be zero is accomplished by means of a servodrive which, in accordance with the present invention, is particularly and specifically constructed as a hydraulic motor 2.

As will be seen from FIG. 1, a bypass line 4 is connected across the displacement meter 1 with the bypass line extending from the inlet of the meter 1 on the downstream side thereof to the outlet of the meter 1 on the upstream side of the flow therethrough. The bypass line 4 has connected therein an integrating primary element 5 which is incorporated into the bypass line and whose function is described in detail in the aforementioned U.S. Pat. No. 3,633,420. Within the scope of the present invention, the primary element 5 is designed preferably in the form of a cup-shaped piston which is made of a light material, for example aluminum, wherein the piston walls are maintained in a configuration which is very thin thereby resulting in the advantage that because of the low mass of the piston friction forces during its movement will be insignificant.

The system shown in FIG. 1 includes a primary element 5. As known from the aforementioned U.S. Pat. No. 3,633,420, the primary element 5 may produce electrical signals or immediate hydraulic signals which can be obtained through photoelectric components, which signals will act upon a regulating unit 6 as a function of the position of the primary element in the pressure difference sensor 5. The regulating unit 6 is incorporated in an auxiliary line 7 leading to the hydraulic motor 2 and branching off the main delivery line from a point downstream of the point from which the bypass line 4 is taken from the main delivery line. Through the auxiliary line 7 and by means of the regulating unit 6 there is delivered hydraulic fluid to the servodrive. The servodrive is constructed as a hydraulic motor and the hydraulic fluid is delivered thereto as a function of the pressure difference measured across the displacement meter in order to adjust the displacement meter in such a manner that the pressure difference equals zero. That is, the servo motor is thus operated to drive the displacement meter in order to maintain the pressure difference thereacross at zero.

The system includes a main pump in the form of a pump 8 which is located upstream of the connection of the auxiliary line 7 with the main line of the system. The pump 8 is located upstream of both the branches of the bypass line 4 and the auxiliary line 7 in the feedline and results in a simplification of the design. The pressure required for the operation of the hydraulic motor is obtained from the same pressure source, that is the pump 8, which also delivers the base fluid medium which is to be measured and which flows through the displacement meter 1 and through the main system. The back flow from the hydraulic motor 2, i.e. the amount of the flowing medium which has passed through the regulating unit 6 at the hydraulic motor 2, may either be delivered back to a tank as indicated by the arrow B or it may be fed back to the suction side of the pump 8 through a line 9 shown in dotted form.

Figure 2:
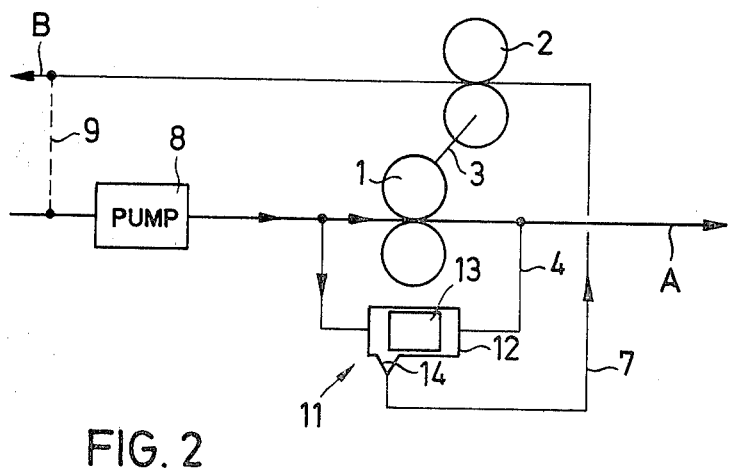
FIG. 2 is a schematic representation of a system according to FIG. 1 but with some modifications.

FIG. 2 shows a system embodying a further simplification as compared with the embodiment according to FIG. 1. In FIG. 2 similar components are identified with like reference numerals as in FIG. 1. The essential difference between the embodiment of FIG. 1 and the embodiment of FIG. 2 resides in the fact that in FIG. 2 the pressure difference sensor and the regulating unit 6 are combined into a single entity identified by the reference numeral 11. The unit 11 essentially consists of a cylinder 12 within which is moveably received a piston 13, which piston is shaped with a cup-like configuration as described in connection with the pressure difference sensor 5. The two end faces of the cylinder 12 are connected across the displacement meter 1 by means of the bypass line 4. At least one outlet 14 is provided in the cylinder wall near that end face of the cylinder 12 which is connected to the point upstream of the displacement meter 1. The auxiliary line 7 leading to the hydraulic motor 2 is connected to this outlet 14. With this approach it is possible to continuously adjust the flow reaching the hydraulic motor 2 in such a manner that the pressure difference across the piston 13 remains zero since the piston of the unit 11 simultaneously performs the dosing of the fluid required by the hydraulic motor 2.

Figure 3:
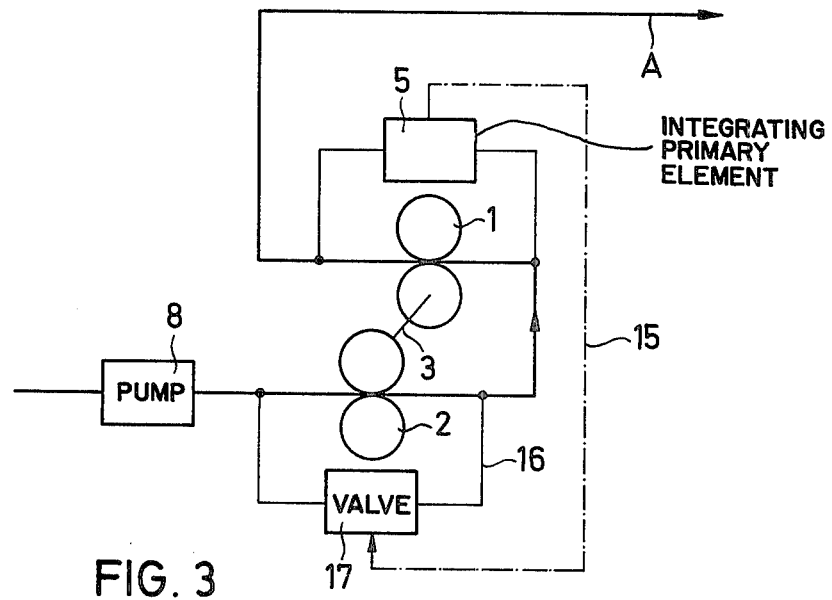
FIG. 3 is a schematic representation of a further embodiment of the invention.

In certain applications of devices such as those of the present invention depicted in FIGS. 1 and 2, a back flow of a large amount of measuring medium is undesirable. Additionally, embodiments of this type require a pump having a comparatively high delivery capacity. In order to counteract such a requirement, the invention enables the hydraulic motor and the displacement meter to be connected in series in such a manner that the fluid medium is first admitted to the hydraulic motor 2 and then is subsequently introduced into the displacement meter 1 wherein the flow of the medium is measured. An embodiment of this type is schematically represented in FIG. 3. In the embodiment of FIG. 3, which basically coincides with the embodiment depicted in FIG. 1, the pressure difference sensor 5 is assigned to the displacement meter 1. Through the electrical or hydraulic signal line 15, the pressure difference sensor 5 emits a regulating signal which adjusts a valve 17 which is arranged in a bypass line 16 connected across the hydraulic motor 2. In this embodiment, the driving power for the displacement meter 1 is controlled by means of the pressure drop at the hydraulic motor 2. In this manner, depending upon the position of the valve 17, a larger or smaller amount of fluid will be delivered to the displacement meter 1 through the hydraulic motor 2. That is, the flow through the hydraulic motor 2 which determines the power output will be controlled through the valve 17.

In situations involving large quantities of flow, the energy required for rotating the displacement meter will be larger than would be the case where smaller flows are involved. Accordingly, a higher power output is required from the hydraulic motor in which case valve 17 must be operated accordingly and further closed. In addition, this measure will result in a larger pressure drop in the hydraulic motor 2 and in the valve 17. Thus, the pump 8 in the case of larger flowing amounts of fluid, must operate against a higher pressure if the pressure at the use point is to be zero.

Figure 4:
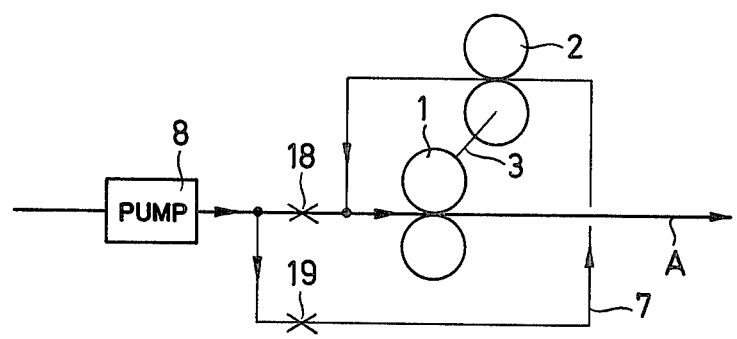
FIG. 4 schematically shows the embodiment which is considered the simplest embodiment of the invention.

In FIG. 4 there is schematically shown a further embodiment which is the simplest embodiment as far as the measuring portion of the apparatus is concerned. In this arrangement wherein a combination of throttles is provided instead of a pressure difference sensor, the pressure difference across the displacement meter 1 is not precisely maintained to be zero. However, since the servodrive function which is performed by the hydraulic motor 2 is always available for driving the displacement meter 1, the hydraulic motor 2 which, even though it is constructed in a very simple arrangement, makes possible a surprisingly high degree of accuracy for the displacement meter. In this case, the fluid required by the point of use will flow in the direction of the arrow A through a nozzle 18 which is incorporated in the main line and which is connected to the outlet side of the pump 8 and through the displacement meter 1. In a similar arrangement, as in the embodiment according to FIG. 1, parallel to the nozzle 18 there is arranged a nozzle 19 located in the auxiliary line 7 leading to the hydraulic motor 2. The nozzle 19 has flowing therethrough the fluid flowing to the hydraulic motor 2 which flow is fed back into the main flow between the nozzle 18 and the displacement meter 1. Thus, this flow also flows through the displacement meter 1 to the point of ultimate use. By skillful adjustment of the nozzles 18 and 19 which may be easily affected by experimentation, and by adjustment of the amount of fluid delivered in each rotation of the displacement meter 1 and the hydraulic motor 2, the power output of the hydraulic motor 2 may be approximately adjusted in such a manner as would be required for the displacement meter 1 within the measuring range considered in each case in order to hold the pressure difference across the displacement meter 1 at zero.

Figure 5:
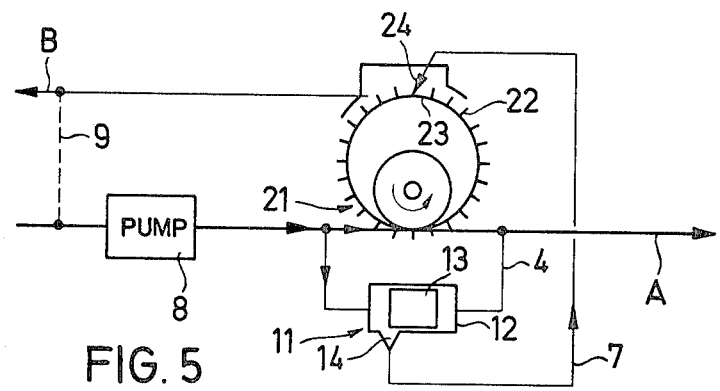
FIGS. 5, 6 and 7 are each schematic representations of further embodiments of the invention showing additional modifications.
Figure 6:
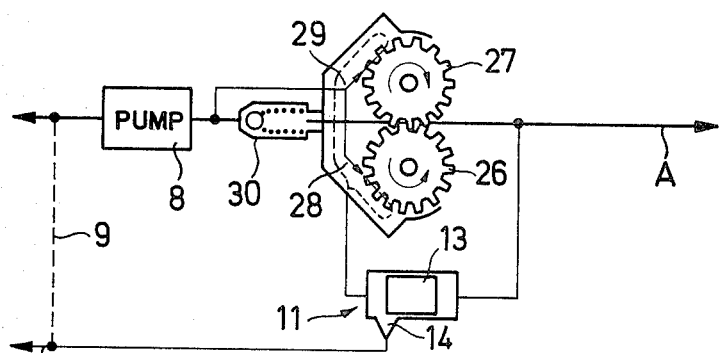
Figure 7:
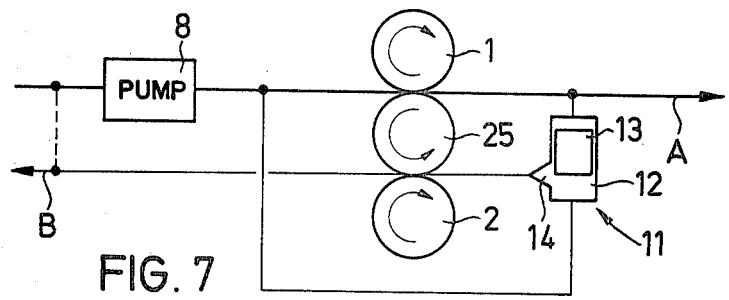

In the embodiments according to FIGS. 5, 6 and 7, the simplifications proposed in accordance with the present invention may be realized with regard to the area of the drive means. The embodiments have in common that the displacement meter and the hydraulic motor are constructed as integrated components. For example, in accordance with the embodiment of FIG. 5, the displacement meter may be constructed as an internal gear pump 21 and the hydraulic motor may be structured as a turbine having blades 22 which are arranged at the outer periphery of the internal gear 23 of the gear pump 21. The remaining arrangement of connections of the system may coincide with the embodiment depicted in FIG. 2 previously described. The fluid conveyed by the unit of components 11, involving the pressure difference sensor plus the regulating unit, through the auxiliary line 7 is fed through a nozzle 24 to the blades 22. That is, the pressure energy is transformed into flow energy and the admission of fluid to the blades 22 of the internal gear 23 of the displacement meter comes from the regulating unit 11. Of course, it will be also possible to arrange for the fluid to act through the nozzle 24 on the teeth at the inner side of the internal gear 23 instead of on the blades 22.

FIG. 6 shows a further variation of a displacement meter having two externally toothed gears 26 and 27 whose teeth may be used in addition to the displacement of the fluid also as turbine blades. A jet of driving energy is imparted at the teeth from the nozzles 28 and 29 or solely from the nozzle 28. A pressure build-up valve 30 provides the necessary pressure head at the nozzle and allows only that amount of fluid which is not required for driving to pass.

The embodiment according to FIG. 7 may be considered a further example of a simplified structure with respect to the design of the integrated component comprising the displacement meter and the hydraulic motor. In this embodiment, an external gear pump is used as the displacement meter whose one gear simultaneously acts as part of an external gear pump forming the hydraulic motor. The driven gear 25 of the displacement meter 1 simultaneously forms the driving gear of the hydraulic motor 2, the direction of rotation of each gear being indicated by arrows appearing in the drawings. The particular advantage of the arrangement according to FIGS. 5 and 6 resides in the fact that, due to the compact structure, such devices may be mounted directly at the housing of the carburetor, a fuel injector or other control system. Indeed, they may be even structurally combined with the housings of such systems. Aside from the advantage of a smaller structure in terms of size, there is also the possibility of achieving a cooling effect at the carburetor, the fuel injector or at other correspondingly equipped control systems by means of the fuel which flows back into the tank as indicated by the arrow B in the drawings.

While specific embodiments of the invention have been shown and described in detail to illustrate the application of the inventive principles, it will be understood that the invention may be embodied otherwise without departing from such principles.

What is claimed is:

1. Apparatus for providing a continuous instantaneous measurement of a flowing fluid and for effecting dosing of said fluid at a particular flow rate, especially for use in fuel systems for combustion engines, comprising: means defining a main flow path for said flowing fluid; a displacement flow meter connected in said main flow path; servodrive means consisting essentially of a hydraulic motor for providing driving energy to said displacement flow meter to overcome the inherent frictional resistance thereof; by-pass means connected with said main flow path defining means for diverting fluid flow therefrom to effect driving of said servodrive means; a pressure difference sensor for sensing the pressure difference across said displacement flow meter; and regulating means responsive to said pressure difference sensor for controlling the flow of said diverted fluid through said by-pass means thereby to control operation of said servodrive means in accordance with the pressure difference across said displacement flow meter.

2. Apparatus according to claim 1 wherein said pressure difference sensor comprises a cup-shaped piston open on one side and arranged within said bypass means to be freely moveable within a range of measurement as a function of the pressure differential in such a manner that its movements effect corresponding changes in at least one of the measured value and the control value of said fluid flow.

3. Apparatus according to claims 1 or 2 wherein the measuring fluid which is utilized is used as a hydraulic fluid.

4. Apparatus according to claim 1 arranged for use with a fuel delivery system and comprising a pressure source for effecting flow of fuel within said system wherein the operating pressure of said hydraulic motor is generated by said pressure source which also generates the delivery pressure for the measuring fluid flowing through said displacement meter.

5. Apparatus according to claim 1 further comprising a regulating unit assigned to said hydraulic motor wherein said pressure difference sensor and said regulating unit are formed to comprise a single unit of components.

6. Apparatus according to claim 5 wherein said unit of components is formed to include a piston moveably received within a cylinder, said cylinder having end faces connected across an displacement meter between said inlet and outlet thereof with said cylinder being provided with at least one outlet port, said outlet port being located closest to the end face of said cylinder which is operatively related to the inlet side of said displacement meter, said apparatus also including an auxiliary line leading from said outlet port to the inlet of said hydraulic motor.

7. Apparatus according to claim 6 wherein said hydraulic motor and said displacement meter have their fluid discharge fed to a point of ultimate use of said fluid, said hydraulic motor and said displacement meter being hydraulically connected in series, with said apparatus further including a valve having said pressure difference sensor acting thereon, said valve being arranged in a bypass line operatively associated with said hydraulic motor.

8. Apparatus according to claim 1 wherein said pressure difference sensor comprises a tuned combination of throttles consisting of a first throttle and a second throttle, said measuring fluid being divided into two partial flows downstream of said displacement meter of which partial flows a first partial flow reaches said displacement meter through said first throttle while the second partial flow is fed through said second throttle to said hydraulic motor, the discharge of said hydraulic motor being delivered to a point upstream of said displacement meter to be combined with the measuring fluid flowing to the point of ultimate use of said apparatus.

9. Apparatus according to claim 1 wherein said displacement meter and said hydraulic motor are constructed as an integrated component.

10. Apparatus according to claim 9 further comprising a regulating unit for said hydraulic motor and wherein said displacement meter consists of an internal gear pump, said internal gear pump having an outer rim which acts as said hydraulic motor, with turbine blades at the outer periphery thereof, fluid flow in said apparatus acting on said blades through a nozzle from said regulating unit.

11. Apparatus according to claim 9 further comprising a regulating unit operatively associated with said hydraulic motor, and wherein said displacement meter consists of an external gear pump including a pair of gears, with the teeth of at least one of said gears serving as turbine blades, fluid flow through said system being admitted to said blades through at least one nozzle from said regulating unit.

12. Apparatus according to claim 9 wherein said displacement meter consists of an internal gear pump including gear means, part of said gear means of said pump simultaneously operating as a part of an external gear pump forming said hydraulic motor.

13. Apparatus according to claim 1 wherein the components forming said apparatus are at least partially structurally integrated for mounting in a housing of the fuel delivery system of a combustion engine.

* * * * *